US012164591B1

(12) United States Patent
Maya et al.

(10) Patent No.: US 12,164,591 B1
(45) Date of Patent: Dec. 10, 2024

(54) NETWORK DATA OBJECT PROCESSING SYSTEM WITH INTERDEPENDENCE IDENTIFICATION ENGINE AND MULTI-CAROUSEL INTERFACE

(71) Applicant: Bytedance Inc., Wilmington, DE (US)

(72) Inventors: Ivan Garcia Maya, Albuquerque, NM (US); Shyam Sundar Rao Mankala, Bangalore (IN)

(73) Assignee: Bytedance Inc., Wilmington, DE (US)

( * ) Notice: Subject to any disclaimer, the term of this patent is extended or adjusted under 35 U.S.C. 154(b) by 0 days.

(21) Appl. No.: 17/692,918

(22) Filed: Mar. 11, 2022

(51) Int. Cl.
*G06F 16/957* (2019.01)
*G06F 3/0482* (2013.01)
*G06F 3/04855* (2022.01)
*G06F 16/9535* (2019.01)

(52) U.S. Cl.
CPC ........ *G06F 16/9577* (2019.01); *G06F 3/0482* (2013.01); *G06F 3/04855* (2013.01); *G06F 16/9535* (2019.01)

(58) Field of Classification Search
CPC ............ G06F 16/9577; G06F 16/9535; G06F 3/0482; G06F 3/04855
See application file for complete search history.

(56) References Cited

U.S. PATENT DOCUMENTS

| | | | | |
|---|---|---|---|---|
| 9,218,392 | B1 * | 12/2015 | Zgraggen | G06F 16/335 |
| 10,395,276 | B1 * | 8/2019 | Fulghum | G06Q 30/0257 |
| 10,438,229 | B1 * | 10/2019 | Viswanath | G06Q 30/0249 |
| 10,558,925 | B1 * | 2/2020 | Flor | G06N 3/04 |
| 2020/0007703 | A1 * | 1/2020 | Kusano | H04N 1/00413 |
| 2021/0319886 | A1 * | 10/2021 | Day | G06F 3/048 |
| 2022/0270153 | A1 * | 8/2022 | Kyung | G06Q 30/0641 |

* cited by examiner

*Primary Examiner* — Andrew T Chiusano
(74) *Attorney, Agent, or Firm* — ALSTON & BIRD LLP

(57) ABSTRACT

A network data object processing system, associated methods, and computer program products are provided. A network data object management module manages purchases represented by the network data object. A hierarchical database management module manages relevancies and relationships amongst registered users, self-selected personas, child-related personas, and co-participant personas. An interdependence identification engine identifies further relationships amongst active data objects and registered users that make associated purchases, and may further correct relationships that may be incorrectly configured by client devices. A multi-carousel interface improves the network data object processing system by increasing relevancy of impressions and improving transparency to users.

9 Claims, 10 Drawing Sheets

What persona(s) best describes you? — 552
- Mom
- Dad
- Young adult

Who do you do things with? — 554
- The guys
- The girls
- Adult only
- Mixed ages

Who do you shop for? — 556
- Spouse
- Kids Under 12
- Teenagers

NETWORK DATA OBJECT PROCESSING SYSTEM WITH INTERDEPENDENCE IDENTIFICATION ENGINE AND MULTI-CAROUSEL INTERFACE

TECHNOLOGICAL FIELD

Various embodiments relate generally to a network data object processing system, and creation, management, transmission, and processing of network data objects using an interdependence identification engine and a multi-carousel interface.

BACKGROUND

Current network object data processing systems have disadvantages, particularly when numerous impressions relating to active data objects are available for display, are initially incorrectly characterized by associated providers, and/or are not relevant for a user. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

An apparatus is provided, that is configured for maintaining an active data object database of active data objects received from a plurality of client devices operable in a network, dynamically determining interdependence amongst the active data objects and a plurality of application variants, and updating a multi-carousel interface to display dynamically identified active data objects based on the interdependence with at least one active application variant. The apparatus comprises at least one processor and at least one non-transitory memory comprising program code, the at least one non-transitory memory and the program code configured to, with the at least one processor, cause the apparatus to at least receive a request from a user device to access at least one of a website or mobile application of a network data object processing system, and in response to receiving the request, determine the at least one active application variant, and a first set of active data objects from the active data object database that are interdependent with the at least one active application variant. The memory and the computer program code are further configured to, with the at least one processor, cause the apparatus to cause display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects.

The memory and the computer program code are further configured to, with the at least one processor, cause the apparatus to, responsive to selection of a selectable active application variant component, dynamically determine a second set of active data objects from the active data object database, each active data object of the second set of active data objects identified based on interdependence with the active application variant associated with the selected selectable active application variant component. The memory and the computer program code are further configured to, with the at least one processor, cause the apparatus to, further responsive to the selection of the selectable active application variant component, cause display of a second set of selectable impressions, wherein each of the selectable impressions of the second set is associated with an active data object of the second set of active data objects.

The memory and the computer program code are further configured to, with the at least one processor, cause the apparatus to cause display of selectable application variant option components, wherein in a circumstance in which a selectable application variant option component is inactive, the corresponding selectable application variant option component comprises (a) a visual component comprising at least an image, and (b) a textual descriptor, and in a circumstance in which a selectable application variant option component is active, the visual component transitions to have a different appearance, and to enable toggling of each of the selectable application variant option components to transition the respective application variant between active and inactive statuses. Each of the selectable impressions indicates an instrument defined by an accepted value, a promotional value, and a provider at which the instrument can be redeemed. The at least one non-transitory memory and the program code are further configured to, with the at least one processor, cause the apparatus to at least, responsive to selection of a selectable impression, enable purchase of an instrument for an accepted value, redeemable for a promotional value at a provider.

A network data object processing system is provided, and is configured to identify interdependence amongst network data objects and active data objects based upon hierarchical relationships amongst registered and predefined persona entities, and modify the active data objects based upon the interdependence. The network data object processing system includes one or more computers and one or more storage devices storing instructions that are operable, when executed by the one or more computers, to cause the network data object processing system to with a hierarchical database management module process registered user data objects received from a plurality of user devices in a network, wherein at least one subject registered user data object references at least one self-identified predefined persona selected via a user interface, at least one co-participant reference to a co-participant predefined persona entity data object indicated via the user interface, and at least one child-related reference to a child-related predefined user data object indicated via the user interface, and insert or update the subject registered user data object in the hierarchical database to include the at least one self-identified predefined persona, the at least one co-participant reference to the co-participant predefined persona entity data object, and the at least one child-related reference to the child-related predefined persona entity data object.

The network data object processing system further includes an active data object configuration module configured to receive active data objects from a plurality of client devices, each active data object comprising at least one of a client device provided predefined persona, a client device provided child-related reference, and a client device provided co-participant reference, and store the plurality of active data objects in an active data object database.

The network data object processing system further includes a network data object management module configured to receive network data objects from a plurality of the user devices, wherein each network data object references an active data object stored in the active data objects database, and is associated with a registered user data object. The network data object processing system further includes an interdependence identification engine to identify an interdependence amongst received network data objects and associated predefined personas, co-participant references, and child-related references of the registered user data object associated with the respective received network data objects. In response to identifying the interdependence, network data object processing system modifies at least one of a predefined persona, a child related reference, or a co-participant reference of a subject active data object in an active data object database to be different from the at least one respective client device provided predefined persona, the client device provided child related reference, or the client device provided co-participant reference.

Modifying the at least one of the predefined persona, the child related reference, or the co-participant reference of the subject active data object in an active data object database comprises deleting at least one of the predefined persona, the child related reference, or the co-participant reference of the subject active data object.

A method is provided and configured for maintaining an active data object database of active data objects received from a plurality of client devices operable in a network, dynamically determining interdependence amongst the active data objects and a plurality of application variants, and updating a multi-carousel interface to display dynamically identified active data objects based on the interdependence with at least one active application variant, the method comprising, receiving a request from a user device to access at least one of a website or mobile application of a network data object processing system, and in response to receiving the request, determining the at least one active application variant, and a first set of active data objects from the active data object database that are interdependent with the at least one active application variant.

The method further includes causing display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects.

The method further includes, responsive to selection of a selectable active application variant component, dynamically determining a second set of active data objects from the active data object database, each active data object of the second set of active data objects identified based on interdependence with the active application variant associated with the selected selectable active application variant component, and further responsive to the selection of the selectable active application variant component, causing display of a second set of selectable impressions, wherein each of the selectable impressions of the second set is associated with an active data object of the second set of active data objects.

The method further includes causing display of selectable application variant option components, wherein in a circumstance in which a selectable application variant option component is inactive, the corresponding selectable application variant option component comprises (a) a visual component comprising at least an image, and (b) a textual descriptor, and in a circumstance in which a selectable application variant option component is active, the visual component transitions to have a different appearance, and enabling toggling of each of the selectable application variant option components to transition the respective application variant between active and inactive statuses. The method further includes, responsive to selection of a selectable impression, enabling purchase of an instrument for an accepted value, redeemable for a promotional value at a provider.

Another method is provide and is configured to identify interdependence amongst network data objects and active data objects based upon hierarchical relationships amongst registered and predefined persona entities, and modify the active data objects based upon the interdependence, the method comprising, with a hierarchical database management module, processing registered user data objects received from a plurality of user devices in a network, wherein at least one subject registered user data object references at least one self-identified predefined persona selected via a user interface, at least one co-participant reference to a co-participant predefined persona entity data object indicated via the user interface, and at least one child-related reference to a child-related predefined user data object indicated via the user interface. The method further includes inserting or updating the subject registered user data object in the hierarchical database to include the at least one self-identified predefined persona, the at least one co-participant reference to the co-participant predefined persona entity data object, and the at least one child-related reference to the child-related predefined persona entity data object.

The method further includes, with an active data object configuration module, receiving active data objects from a plurality of client devices, each active data object comprising at least one of a client device provided predefined persona, a client device provided child-related reference, and a client device provided co-participant reference, and storing the plurality of active data objects in an active data object database. The method further includes, with a network data object management module, receiving network data objects from a plurality of the user devices, wherein each network data object references an active data object stored in the active data objects database, and is associated with a registered user data object.

The method further includes with an interdependence identification engine, identifying an interdependence amongst received network data objects and associated predefined personas, co-participant references, and child-related references of the registered user data object associated with the respective received network data objects, and in response to identifying the interdependence, modifying at least one of a predefined persona, a child related reference, or a co-participant reference of a subject active data object in an active data object database to be different from the at least one respective client device provided predefined persona, the client device provided child related reference, or the client device provided co-participant reference.

Modifying the at least one of the predefined persona, the child related reference, or the co-participant reference of the subject active data object in an active data object database comprises deleting at least one of the predefined persona, the child related reference, or the co-participant reference of the subject active data object.

A computer program product is also provided, configured for maintaining an active data object database of active data objects received from a plurality of client devices operable in a network, dynamically determining interdependence amongst the active data objects and a plurality of application variants, and updating a multi-carousel interface to display dynamically identified active data objects based on the interdependence with at least one active application variant, the computer program product comprising at least one non-transitory computer-readable storage medium having computer-executable program code instructions stored therein, the computer-executable program code instructions comprising program code instructions to receive a request from a user device to access at least one of a website or mobile application of a network data object processing system, and in response to receiving the request, determine the at least one active application variant, and a first set of active data objects from the active data object database that are interdependent with the at least one active application variant.

The computer-executable program code instructions further include program code instructions to cause display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects, and, responsive to selection of a selectable active application variant component, dynamically determine a second set of active data objects from the active data object database, each active data object of the second set of active data objects identified based on interdependence with the active application variant associated with the selected selectable active application variant component, and further responsive to the selection of the selectable active application variant component, cause display of a second set of selectable impressions, wherein each of the selectable impressions of the second set is associated with an active data object of the second set of active data objects.

The computer-executable program code instructions further comprise program code instructions to cause display of selectable application variant option components, wherein in a circumstance in which a selectable application variant option component is inactive, the corresponding selectable application variant option component comprises (a) a visual component comprising at least an image, and (b) a textual descriptor, and in a circumstance in which a selectable application variant option component is active, the visual component transitions to have a different appearance, and enable toggling of each of the selectable application variant option components to transition the respective application variant between active and inactive statuses. The computer-executable program code instructions further comprise program code instructions to responsive to selection of a selectable impression, enable purchase of an instrument for an accepted value, redeemable for a promotional value at a provider.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE SEVERAL VIEWS OF THE DRAWINGS

Reference will now be made to the accompanying drawings, which are not necessarily drawn to scale, and wherein:

FIGS. 4 and 5A-5F are example user interfaces that may be generated by a network data object processing system in accordance with various embodiments of the present disclosure;

DETAILED DESCRIPTION

The present disclosure describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Figure 4:
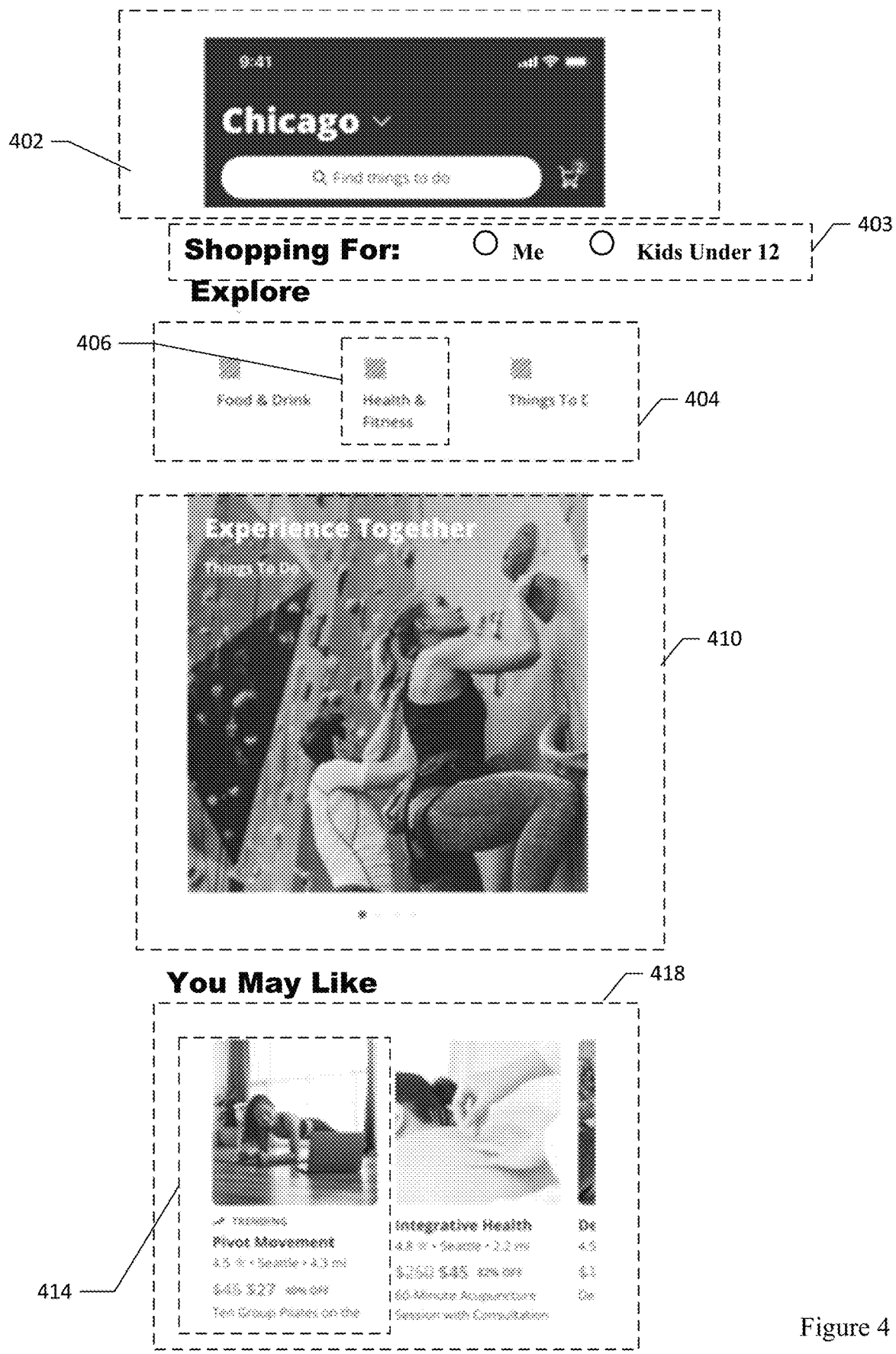

Various embodiments of the present disclosure relate generally to an improved user interface including a multi-carousel interface, for example, as shown in FIG. 4, that is configured to enable a user (e.g., a consumer or potential consumer of instruments) to review active application variant components and visual impressions of data and content associated therewith, as maintained and provided by a network object data processing system. The multi-carousel interface may be used as part of a standalone service, application, or device or it may be applied as a layer atop an existing service, application, or device (e.g., an existing network object data processing system).

As will be discussed in greater detail below, the multi-carousel interface comprises at least a scrollable exploration carousel and a scrollable impression carousel. The scrollable exploration carousel includes a plurality of selectable active application variant components representing respective active application variants. An application variant may be associated with a category, and active application variants refer to specifically identified application variants for a particular user, due to their relevancy, and/or selection by a user such as during registration with the app or website, during profile configuration, based on processing of implicit data, and/or the like. The scrollable impression carousel may include impressions that provide data and content associated with active data objects associated with the one or more active application variants.

It is undesirable for network object data processing systems and associated interfaces to not indicate to a user, the active application variants that may limit or otherwise filter the displayed impressions, or to not indicate why such impressions are being limited or otherwise filtered. For example, not clearly indicating the active application variants, may result in excessive searching for impressions, which may increase network traffic and unnecessary computing resource consumption (for example, an increase in processor workload) of the system, or lead to abandonment of user-interaction with the network object data processing systems. Moreover, it is undesirable to default to providing impressions associated with all application variants available to the network object data processing system, to users, including superfluous information that may be irrelevant to the user, such as when examples of the present disclosure are not implemented.

Such deficiencies including the unnecessary consumption of resources may be exacerbated as the number of users, application variants, and/or active data objects increase for any particular network object data processing system. Such a configuration is not only inefficient, but also counter-intuitive to the underlying objectives of a network object data processing system, which includes, among other objectives, efficiently providing relevant impressions to a vast array of users over a network.

Example embodiments of the present disclosure may overcome the above-referenced technical challenges while providing various technical benefits. For example, various embodiments of the present disclosure increase the efficiency and effectiveness of a network object data processing system. In certain instances, it may be desirable for users to view, access, control, and/or manage a subset (e.g. a limited set) of application variants that are relevant and/or important to the user, rather than overwhelming the user with all active data objects associated with all application variants. Additionally or alternatively, the above-referenced challenges are addressed by example embodiments by displaying which application variants are active for the user. Accordingly, the user may understand why certain impressions are displayed, and reduce the need for resource intensive searching, as any issues with relevancies can be addressed by modifying which application variants are active, thereby more efficiently controlling the determining of which impressions are displayed.

From the user experience perspective, multi-carousel interfaces structured in accordance with various embodiments of the present disclosure enable each user to at least partially direct their own preferences that apply to its respective active application variants, and be reminded thereof while browsing impressions, thereby enhancing organizational productivity and efficiency by providing visible rationale as to the selection or filtering of impressions. For example, an multi-carousel interface structured in accordance with various embodiments of the present disclosure enables users to spend less time navigating an overwhelming mixture of relevant and irrelevant information and instead, allows a user to quickly access and data relevant to, for example, the user's preferences, such as organized in the scrollable exploration carousel and the scrollable impression carousel.

Applicant has identified that methods, apparatus, systems, and computer program products structured in accordance with certain embodiments of the present disclosure provide reduced network traffic and computing resource consumption by only transmitting a subset of active data objects (e.g., associated with scrollable impression carousel) rather than the entirety of the active data objects available, and further displaying the active application variants so that the user understands that only the subset of all active data objects are displayed.

Such reduced network traffic and data processing amounts to increased security and less strain on the network object data processing system itself, leading to increased lifetime and efficiency of the network object data processing system. Moreover, by permitting the active application variants and impressions (or a limited set of impressions) to be organized and relocated for display in the multi-carousel, the system's ability to display relevant information and invoke interaction with the user is improved. As such, systems structured in accordance with various embodiments of the present disclosure may reduce computing resource consumption and provide specific, technical solutions to technical problems faced by existing systems, the details of which are described herein.

The various implementations of the multi-carousel interface of the present disclosure are not limited to displaying impressions associated with particular examples of network object data processing systems discussed herein, and can instead be configured to display a wide variety of data characteristics for any set of data that might be of interest to a user. The multi-carousel interface may be used to visualize any set of data for any purpose and it may be used in connection with numerous exemplary system architectures as explained in further detail herein. One of ordinary skill in the art will appreciate that the multi-carousel interface related concepts discussed herein may be applied to better visualize characteristics of interest for a wide variety of objects and/or data sets.

Certain network data object processing systems, such as those described in further detail herein, are configured to facilitate the creation and maintenance of active data objects, representative of promotions. Users may purchase instruments of the promotions via a user interface, such as the disclosed multi-carousel interface, of the network data object processing system. Such activities may be initiated, authorized, and/or confirmed by numerous user devices running software applications, such as mobile software applications, operative in a dynamic network ecosystem accessed by different user types, such as registered users and providers of the promotions. The network data object processing system therefore facilitates the creation and processing of network data objects that are representative of transactions in which users purchase an instrument of a promotion via software applications of the network data object processing system. Such software applications may be hosted by the network data object processing system.

The network data object processing system may be implemented as a promotion system, to process network data objects indicative of transactions in which users purchase instruments of promotions made available for sale at an accepted value, for redemption at a particular provider, for goods or services worth a promotional value. The user of the network data object processing system is incentivized to initiate network data objects because the promotional value is often more than the accepted value. As described above, certain deficiencies may exist in current network data object processing systems, such as those related to a user interface that a user accesses to browse and purchase instruments associated with an active data object, by way of a network data object. Some consumers indicate dissatisfaction with the impressions of active data objects shown in the user interface. In some scenarios, patterns of decreased purchase volumes may be detected even though the number of available active data objects increase. Such consumers that express dissatisfaction or decrease their purchase volumes may not understand why or how the active data objects are selected for their viewing.

In this regard, an improved network data object processing system includes a user interface component engine that provides an improved user interface, such as the multi-carousel interface, that displays to the user the application variants associated with the user's registration that impact which active data objects and respective impressions are displayed to the user. The user may therefore browse and control the application variants such that impressions of different active data objects are displayed.

At least one additional deficiency in current network data object processing systems including user interfaces thereof, is that providers, retailers, or merchants that engage with the network data object processing system to configure an active data object representative of a promotion, may often overzealously select several application variants, or categories, and/or other characterizations with which to associate the active data object. For instance, when a user affiliated with a provider (e.g., a merchant of a good or service being promoted) configures an active data object, the user may manually select categories configured as application variants to associate with a promotion. Because the user, representing the provider, wants an impression associated with the active data object to be presented to as many consumers as possible, the user may select every option presented, or more application variants than what is appropriate or realistically descriptive of the promotion. In this regard, irrelevant or less relevant impressions may be displayed to a consumer, further diminishing interest of the consumer, and potentially decreasing purchases by the consumer, revenue for the promotion service, and revenue for the provider.

Accordingly, the improved network data object processing system further comprises an interdependence identification engine that intelligently determines relationships amongst registered user data objects, predefined persona data objects, application variants, and active data objects. The interdependence identification engine may determine such relationships by analyzing network data objects representative of purchased instruments and identifying correlations amongst the associated registered user data objects, predefined persona data objects, application variants, and active data objects.

The improved targeting of relevant active data objects for a consumer-user may increase user satisfaction and visits to the mobile application or website of the improved network data object processing system, thereby increasing purchases, and profits for the promotion service and provider. As described above, the improved network data object processing system may further reduce unnecessary resource consumption and improve the system's ability to efficiently provide relevant impressions to the user.

Definitions

As used herein, the terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

As used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

As user herein, the term "network data object processing system" refers to a system employing example embodiments to facilitate the receipt of network data objects, and processing thereof. The network data object processing system may include a server and/or distributed computing system configured to host one or more applications and supporting software and/or hardware and may operate as compiled code bases or repositories to support certain operations described herein. The network data object processing system may be managed by, and/or employed by a promotion system and/or promotion service that facilitates the sale, configuration, and management of promotion, each having a respective active data object stored within the network data object processing system.

The network data object processing system, or an associated system, may therefore facilitate the management of data objects, such as active data objects, representative of promotions. The network data object processing system, or an associated system may therefore store "data object identifiers" which are unique identifiers, such as but not limited to unsigned integers represented externally (outside of memory) as a base-34 encoded string or any combination of American Standard Code For Information Interchange (ASCII) characters, that unique identify a promotion, and/or active data object. The term "active data object" may also be referred to as a "promotion data object" and may include any data structure representative of any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. The active data object may include or indicate, an accepted value, a promotional value, a good or service, and a provider. For example, the network data object processing system may enable a user to purchase a promotion for an accepted value of $30 for a promotional value of $50, redeemable for dine-in (e.g., a service) at a particular restaurant (e.g., the provider), and/or the like. In this regard, the accepted value is representative of a discount of $20. The active data objects may be tracked in an active data object database, which may include any suitable hardware and/or software configurations to store and track instances of the active data objects representing purchasable instruments of a promotion.

An "instrument" associated with a promotion may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to spend at the restaurant. In some examples, the accepted value of the instrument is defined by the value exchanged for the instrument at the time of purchase. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like. An instrument may be stored in an electronic account or in association with an electronic account, by way of insertion in a database such that the associated user can redeem the instrument at a provider, such as by accessing an app and/or website and presenting a rendered version of the instrument, and/or an associated code.

A "network data object" refers to a data structure representative of a purchased instrument, and is received by the network data object processing system over a network, responsive to a user engaging with a user interface to purchase the instrument in a transaction. The network data object may be issued by a specifically configured software application or "app" running on a user device, such as associated with the network data object processing system. An instance of a network data object may represent a transaction initiated by a user to purchase the instrument and is uniquely identifiable by a "network data object identifier," which may include any unique identifier of the network data object. The network data object and/or network data object identifier can be stored in association with any data associated with the transaction in which the user purchased the instrument, the instrument purchased, the associated promotion, the associated provider, the purchasing user, and/or the like. A "network data object management module" may include any hardware and/or software configurate to facilitate the processing of network data objects, indicating the purchase of an instrument associated with an active data object by a registered user.

As used herein, the term "registered user data object" should be understood to refer to a registered user of the network data object processing system, such as an individual who purchases an instrument, and any user data pertaining to the registered user. In one embodiment, a "registered user identifier" uniquely identifying a registered user may be stored as an unsigned integer and represented externally (outside of memory) as a base-34 encoded string. In other embodiments, registered user identifier may comprise a combination of ASCII characters. In certain embodiments, the transmitting candidate user identifier may be a user logon or email address, such as one with which a user logons to securely access the network data object processing system.

A "predefined persona data object" is representative of a characteristic or characteristics identifying a persona, but not necessarily a particular user or a particular person, and may therefore be considered an unregistered persona data object or unregistered predefined persona data object For example, a predefined persona may include a child under the age of 12, a boy, a parent, and/or the like. The predefined persona data object may therefore include any number of characteristics, such as 'child under the age of 12' and 'boy,' such as may be contained within a single instance of a predefined persona data object. Many variations may be contemplated.

A "hierarchical database" may be any hardware and/or software implemented data storage mechanism for storing and/or tracking relationships amongst registered user data objects and predefined persona data objects. In this regard, the hierarchical database may store registered user data objects or references thereto, and/or predefined persona data objects or references thereto, as well as references therebetween. A "child-related predefined persona data object" may represent a purchasing relationship, such as a child-reference defined via a link or pointer in the hierarchical database, between a registered user data object and a predefined persona data object representing a person for which the registered user purchases things. For example, a registered user may indicate via a user interface that they purchase things for their daughter under the age of 12. A predefined persona data object representing a girl under the age of 12 may therefore be considered a child-related predefined persona data object to the parent that is the registered user. If a registered user data object has an associated child-related predefined persona data object, this may enable an optional child-related user mode, which when activated, causes application variants (e.g., categories) and/or displayed impressions, to be targeted toward the child-related predefined persona rather than the registered user.

A "co-participant predefined persona data object" may represent a co-participant relationship between a registered user data object and a predefined persona data object representing a person with which they do things. For example, a registered user may indicate they do things with young children (e.g., under the age of 12), a spouse or partner, other adults, and/or a mix of ages. In this regard, a registered user data object and a predefined persona data object may be linked in the hierarchical database with a co-participant reference, such as a pointer, to indicate the predefined persona data object is a co-participant predefined persona data object to the registered user data object. A predefined persona data object may be further referenced by a registered user data object as a "self-identified predefined persona," for instance, when the registered user has identified themself as having the particular characteristic associated with a persona, such as "dad." A registered user data object may additionally or alternatively have a relationship or link to an "application variant," or category of promotions, such as but not limited to 'food and drink,' 'health and fitness,' and 'things to do.' An "active application variant" may refer to an application variant that is referenced and/or indicated, such as in a hierarchical database, as being active, or relevant, for a particular user. For example, an application variant may be selected by a user, such as using one or more user interfaces, such as for example the user interface of FIG. 5B, described in further detail herein. The active application variant impacts which promotions an application of the network data object processing system displays to the registered user.

Relationships between registered user objects and predefined personas, and/or between registered user objects and application variants may be tracked in a variety of ways. For example, a registered user data object may comprise one or more fields representative of child-relationships, co-participant relationships, and/or self-identified participants, each of which may reference a predefined persona data object. Additionally or alternative, an active data object may reference any number of predefined persona data objects to reference a relationship of a persona that may have an interest in an associated promotion and/or instrument. Still further, the active data object may reference application variants to indicate which categories with which a promotion is associated. The "hierarchical database management module" may include computer program instructions to process user input and selection relating to hierarchical relationships and/or preferred application variants, and maintain the indicated relationships in the hierarchical database. The hierarchical database management module may be further utilized to maintain relationships between active data object and any relationships maintained in the hierarchical database, such as but not limited to application variants, personas, and/or the like.

An "interdependence identification engine" of the network data object processing system may include any hardware and/or software configured to analyze and determine relevancy, such as interdependence amongst network data objects (representative of purchases by registered users), predefined personas, application variants, and/or relationships tracked by the hierarchical database. In this regard, interdependence may refer to likelihood of a particular promotion identified by an active data object being purchased by a registered user associated with a particular predefined persona data object, and the likelihood of a registered user purchasing a particular type of promotion associated with an active data object.

A "active data object configuration module" of the network data object processing system may include any hardware and/or software configured to enable configuration, via a client device, of an active data object, representative of a promotion to be offered for sale. The active data object configuration module further enables a user at the client device, such as a provider device, to configure application variants believed to be associated with an active data object. The term "client device" refers to computer hardware and/or software that is configured to access a service made available by a server, such as the network data object processing system. Client devices may include, without limitation, a user device such as a smart phone, tablet computer, laptop computer, personal computer, enterprise computer, and the like. Client devices, as described herein, communicate with, and otherwise access systems such as the network data object processing system via one or more networks. According to example embodiments, a client device may include a "provider device," that is a client device configured to access certain functionality of the network data object processing system, such as functionality enabling configuration of active data objects and the promotions they represent, to be offered for sale via the network data object processing system on behalf of the provider. In some instances, a client device may be implemented as a "user device," or "consumer device," with which a consumer or other user may access certain functionality of the network data object processing system, such as browsing for and/or purchasing a promotional instrument.

A "user interface component engine" may include any hardware and/or software configured to generate user interface components to be provided by the network data object processing system for display at a client device. A user, such as a provider or retailer, may utilize such user interfaces to configure an active data object associated with a promotion. A user, such as a consumer, may utilize a user interface of the network data object processing system to purchase a promotional instrument, provide indications regarding hierarchical relationships, preferred application variants, and/or the like.

Example System Overview

Systems and methods of the present disclosure may be embodied by any of a variety of devices. For example, the systems and methods of an example embodiment may be embodied by a networked computing device (e.g., an enterprise platform), such as a server or other network entity, configured to communicate with one or more devices, such as one or more user devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
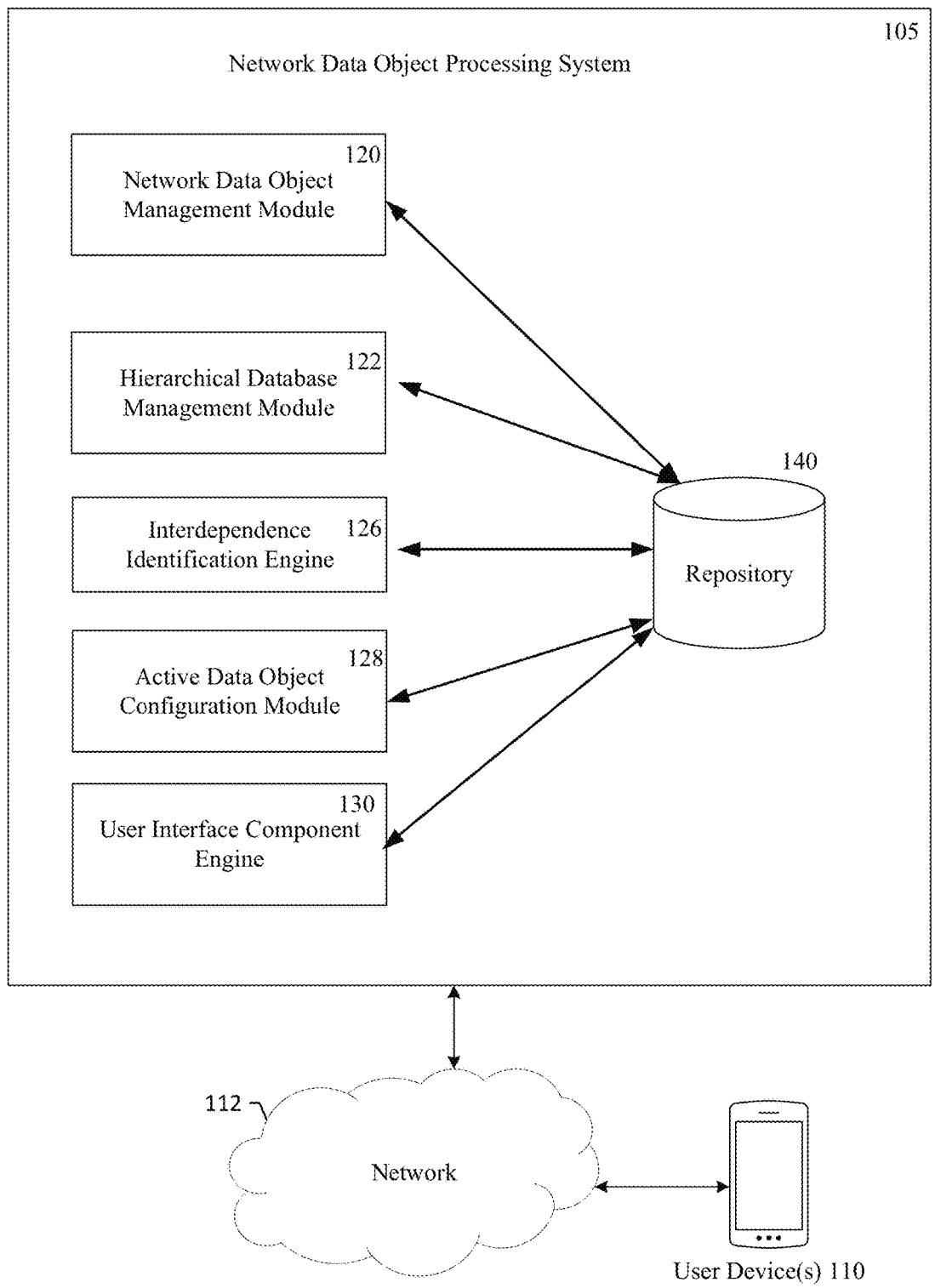
FIG. 1 shows a schematic view of a network data object processing system in data communication with a user device, according to certain example embodiments.

FIG. 1 illustrates an example computing environment 100 within which embodiments of the present disclosure may operate. Users may communicate with a network data object processing system 105 via a network 112 using user devices 110. The network data object processing system 105 may comprise a network data object management module 120, hierarchical database management module 122, interdependence identification engine 126, active data object configuration module 128, and user interface component engine 130. The modules may be implemented with hardware and/or software to perform the functionality introduced above and described in further detail herein. One or more of the modules may be in data communication with one or more repositories 140.

Network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 112 may include a cellular telephone, an 802.11, 802.16, 802.20, and/or WiMax network. Further, the network 112 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the network data object processing system 105.

The repository 140 may be embodied as a data storage device such as a Network Attached Storage (NAS) device or devices, or as a separate database server or servers. The repository 140 includes information accessed and stored by the network data object processing system 105 to facilitate the operations of the network data object processing system 105. For example, the repository 140 may store, without limitation, data such as active data objects (such as in an active data object database), network data objects, user data (e.g., relating to registered users) such as in a registered user database, relationship data in a hierarchical database, and/or other data to facilitate the operations of the network data object processing system 105. In some embodiments repository 140 may include the active data object database, registered user database, and/or hierarchical database.

The user devices 110 may be any computing device as defined above. Electronic data that is received by the network data object processing system 105 from the user devices 110 may be provided in various formats and via various methods. For example, the user devices 110 may include desktop computers, laptop computers, smartphones, netbooks, tablet computers, and the like.

In embodiments where a user device (e.g., a user device 110) is a mobile device, such as a smartphone, laptop, tablet, or the like, the user device may execute an application, or "app," to interact with the network data object processing system 105. Such apps are typically designed to execute on mobile devices, such as tablets or smartphones. For example, an app may be provided that executes on mobile device operating systems such as iOS®, Android®, Windows® or the like. These platforms may provide frameworks that allow apps to communicate with one another and with particular hardware and software components of user devices. Additionally, or alternatively, user devices 110 may interact with the network data object processing system 105 via a web browser. As yet another example, user devices 110 may include various hardware or firmware designed to interface with the network data object processing system 105.

Example Apparatus for Implementing Embodiments of the Present Disclosure

Figure 2:
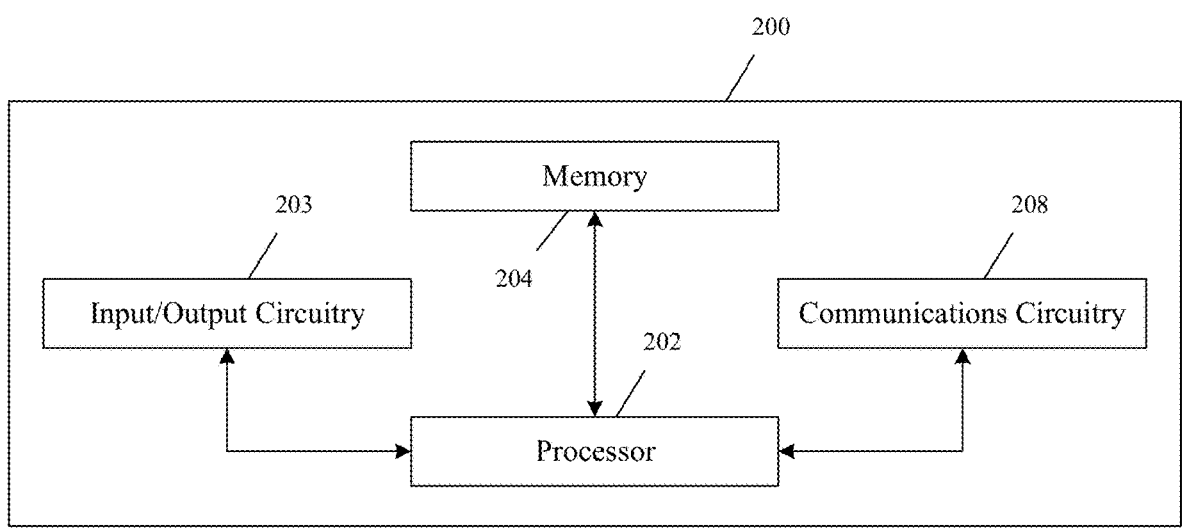
FIG. 2 shows a schematic view of an apparatus, such as a network data object processing system, configured according to certain example embodiments.

The network data object processing system 105 may comprise or be embodied by one or more computing systems, such as apparatus 200 shown in FIG. 2. An example apparatus 200 may additionally implement any of the user device(s) 110.

Apparatus 200 may include a processor 202, a memory 204, input/output circuitry 203, and communications circuitry 208. The apparatus 200, when implemented as the network data object processing system 105 may be configured, using the memory 204 and/or one or more of the processor 202, input/output circuitry 203, and communications circuitry 208 to execute the operations described herein.

Although the components are described with respect to functional limitations, it should be understood that the particular implementations necessarily include the use of particular hardware. It should also be understood that certain components of the components described herein may include similar or common hardware. For example, two sets of circuitry and/or two modules may both leverage use of the same processor, network interface, storage medium, or the like to perform their associated functions, such that duplicate hardware is not required for each set of circuitry and/or module. The use of the term "circuitry" or "module" as used herein with respect to components of the apparatus should therefore be understood to include particular hardware configured to perform the functions associated with the particular circuitry and/or module as described herein.

The term "circuitry," or "module," as defined above, should be understood to include hardware and, in some embodiments, software for configuring the hardware. For example, in some embodiments, circuitry and/or a module may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store modules, information, data, content, applications, instructions, or the like, for enabling the apparatus 200 and/or network data object processing system 105 to carry out various functions in accordance with example embodiments of the present disclosure. For example, memory 204 may include any of the modules 120, 122, 126, 128, 130, and/or portions thereof. In this regard the memory 204 may store the computer program code included in any of the modules, that directs the processor 202 to perform associated functions of the modules. The memory 204 may further comprise one or more repositories 140, such as but not limited to an active data object database, a registered user database, and/or a hierarchical database.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure. Alternatively, as another example, when the processor is embodied as an executor of software instructions, the instructions may specifically configure the processor to perform the algorithms and/or operations described herein when the instructions are executed.

In some embodiments, apparatus 200 may include input/output circuitry 203 that may, in turn, be in communication with processor 202 to provide output to the user and, in some embodiments, to receive an indication of a user input. The input/output circuitry 203 may comprise a user interface and may include a display, a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna(s) to cause transmission of signals via the antenna(s) or to handle receipt of signals received via the antenna(s).

The communications circuitry 208 includes hardware and software configured to support amongst components of computing environment 100. The communications circuitry 208 may utilize processing circuitry, such as the processor 202, to facilitate such communications. It should also be appreciated that, in some embodiments, the communications circuitry 208 may include a separate processor, specially configured field programmable gate array (FPGA), or application specific interface circuit (ASIC).

It is also noted that all or some of the information discussed herein can be based on data that is received, generated and/or maintained by one or more components of the network data object processing system 105. In some embodiments, one or more modules 120, 122, 126, 128, and/or 130 may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data to a client device, such as a user device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Processes

Figure 3:
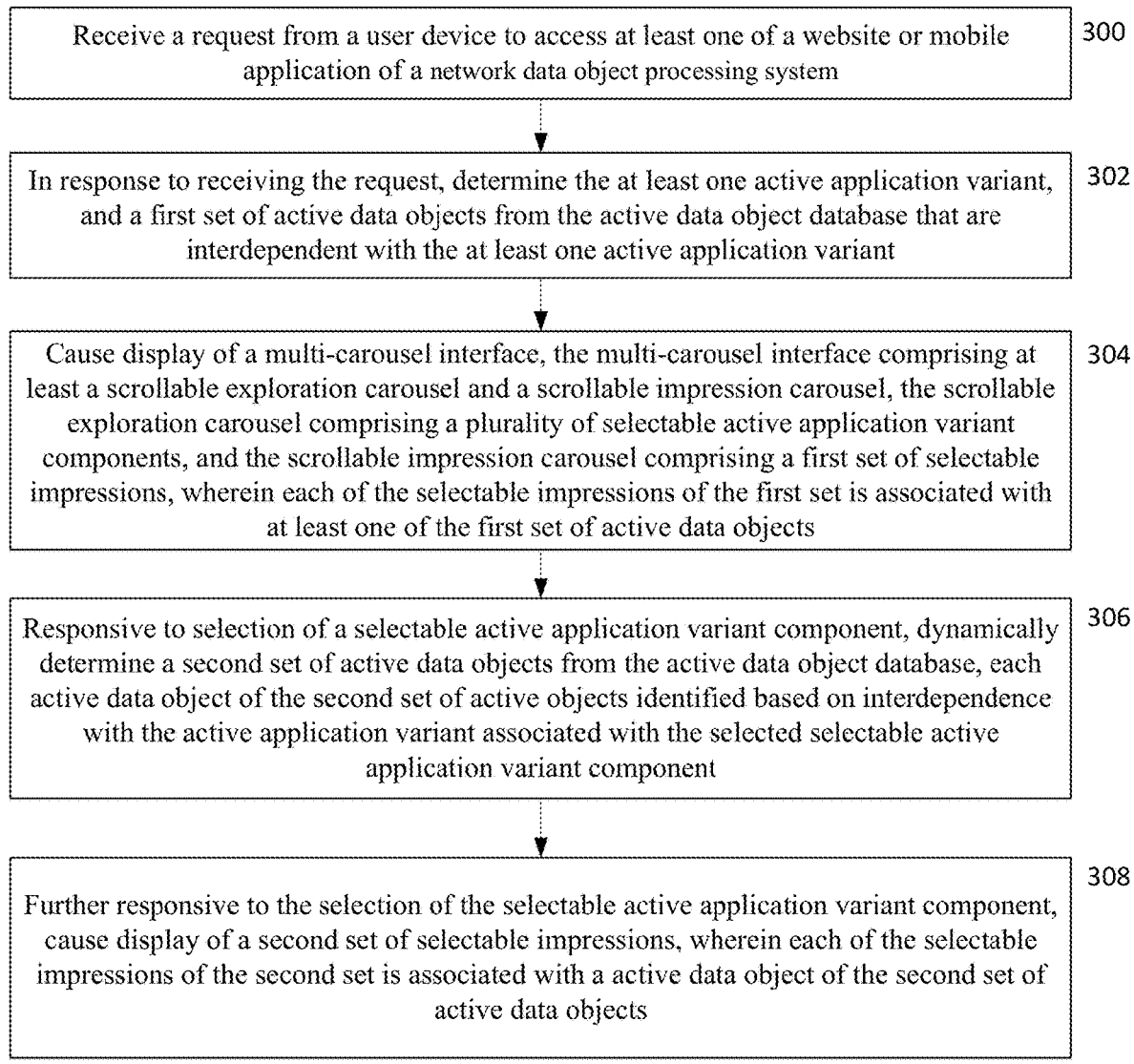
FIG. 3 is a flowchart illustrating operations performed by a network data object processing system in accordance with various embodiments of the present disclosure.

FIG. 3 is a flowchart of operations that may be performed by the network data object processing system 105 according to example embodiments. As shown by operation 300, the network data object processing system 105 includes means, such as memory 204, processor 202, input/out circuitry 203, communications circuitry 208 and/or the like, for receiving a request from a user device, such as user device 110, to access at least one of a website or mobile application of a network data object processing system. In this regard a user may be a registered user with their credentials such as a logon identifier and a password stored within a mobile application operative on the mobile device, and/or in an Internet browser of the device. Additionally or alternatively, a user may provide a logon identifier and password upon attempting to access the website or mobile application. In any event, the network data object processing system 105 validates the credentials, and if valid, proceeds to operation 302.

As shown by operation 302, the network data object processing system 105 includes means, such as memory 204, processor 202, hierarchical database management module 122, repository 140, and/or the like, for in response to receiving the request, determining the at least one active application variant, and a first set of active data objects from the active data object database that are interdependent with the at least one active application variant. The active application variants may be selected from a plurality of application variants preconfigured by the network data object processing system 105. For example, a plurality of available application variants may include 'food and drink,' 'health and fitness,' 'things to do,' 'travel,' 'pets' and/or the like, but the selected, or active application variants for a particular registered user may include only a subset thereof, such as 'food and drink,' 'health and fitness,' and 'things to do.' The application variants are referred to as 'active' as they are the previously selected application variants for the registered user that drive certain functionality of the user interface of the network data object processing system 105. The active application variants may be accessed by the hierarchical database management module 122, such as by accessing the repository 140. The first set of active data objects may be identified in repository 140 and/or an active data object database as being associated with any of the active application variants. In this regard, example embodiments query the repository 140, and/or active data object database, with an associated application variant(s).

As shown by operation 304, the network data object processing system 105 includes means, such as memory 204, processor 202, user interface component engine 130, hierarchical data management module 122, repository 140 and/or the like, for causing display of a multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects.

FIG. 4 is an example user interface that may be generated according to the user interface component engine 130 of example embodiments. Area 402 of the user interface includes a current location, search tool bar, shopping cart icon, and a time-sensitive message and/or incentive. The optional browsing for toggle 403 enables a user to switch modes between a self-shopping user mode and a child-related user mode. Any number of child-related predefined persona data objects may be displayed in the browsing for toggle 403 along with an option such as 'me' representing the registered user. If the user selects 'me,' relevant applicant variants according to their associated registered user data object are populated in the user in scrollable exploration carousel 404 as described in further detail below, and relevant impressions are displayed in scrollable impression carousel 418 as described in further detail below. If the user selects a child-related predefined persona data object, such as 'kids under 12,' data and impressions described with respect to FIG. 4 below, may be relevant to the child-related predefined persona data object, rather than the registered user. In this regard, the registered and logged on user is browsing for and/or shopping for a different persona than themselves, and the displayed data and content is determined as relevant for the different persona (child-related predefined persona data object) rather than the registered and logged on user.

The scrollable exploration carousel 404 includes a plurality of selectable active application variant components 406, such as those labeled as 'food and drink,' 'health and fitness,' and 'things to do,' which are each associated with the active application variants of the registered and logged on user, or in the case of a child-related mode, may relate to a selected child-related persona. The active application variants may be defaulted in the user interface of FIG. 4, based on selection of corresponding active application variants selected by a user via a separate process and/or user interface, such as the example interfaces of FIGS. 5A-5F. In certain embodiments, a user may be directed to select application variants upon registering with the network data object processing system 105.

In this regard, the user interface component engine 130 generates the scrollable exploration carousel 404 such that a user can scroll, swipe, or otherwise navigate to view all selectable active application variant components 406 associated with all the user's active application variants (or selected child-related predefined persona data object in a circumstance the browsing for toggle 403 indicates as a selected child-related predefined persona data object). In certain examples, an initial selectable active application variant component 406 may be defaulted, even if a user has not yet selected a selectable active application variant component 406. Additionally or alternatively, a user may select a selectable active application variant component 406 to view impressions of promotions, such as those associated with active data objects, related to the associated active application variant.

In this regard, example embodiments query the repository 140, and/or active data object database, with an associated application variant of a selected or defaulted initial selectable active application variant component 406, such as 'things to do.' In certain embodiments, other query parameters, such as the registered user's profile location, real-time location as indicated by a global positioning system (GPS) other sensor and/or the like, preference data including explicitly selected or entered user data, and/or implicit data such as browser history, purchase history, device context, consumer context, and/or the like, may be utilized to query the repository 140 for active data objects. For example, a user may express interest in seeing impressions of promotions relating to newer promotions, kids promotions, grooming promotions, health promotions, recently issued promotions, or other promotions in different themes, the categories and/or subcategories of the promotion, the price range of the instrument, the location in which the promotion is offered (such as a specific city in which the promotion is offered), etc. In instances in which implicit data is detected and/or stored (such as from browser history, purchase history, device context, consumer context, and/or the like), a user interface of the network data object processing system 105 may optionally provide a confirmation to the user to enable the user to confirm or decline the addition of application variant and/or categories associated with the implicit data. In this regard, is a user is prompted and confirms or accepts the suggestion, the application variant determined based on the implicit data may be linked to the registered user data object associated with the user. If declined by the user, the respective application variants are not linked to the registered user data object. The prompt may be optionally implemented in certain embodiments, such that if the prompt is not implemented, the system may in some embodiments, add the application variants determined based on implicit data, by default and without user approval.

In any event, the selectable impressions 414 of the scrollable impression carousel 418 are targeted for the registered user based on a selected and/or defaulted one or more selectable active application variant components. In this regard, the initial selectable impressions 414 displayed in response to the user initially accessing the mobile application and/or website may resemble the first set of active data objects, that are retrieved and/or identified based on references or associations with the same active application variant selected and/or defaulted. A selectable impression 414 may include any information relating to the active data object, instrument and/or promotion to which it pertains, such as but not limited to a name of a provider, a short name of promotion, a promotional value, an accepted value, a percentage off, a star rating, a distance from a current location and/or selected location, and/or the like.

Any of the first set of selectable impressions 414 in the scrollable impression carousel 420, each associated with one of the first set of active data objects may be selected to access further details regarding an associated instrument and/or promotion. Additionally or alternatively, the user may scroll, slide, and/or otherwise navigate the scrollable impression carousel 418 to view certain selectable impressions 414 that may not be within the initial view of the scrollable impression carousel 418. The user may engage with the user interface to purchase an instrument of the promotion such that the instrument may be purchased for the accepted value and subsequently redeemed at the provider for the promotional value. Utilizing the scrollable impression carousel 418 enables example embodiments to display a certain level of detail (e.g., name of provider, short name of promotion, promotional value, accepted value, percentage off, star rating, distance, etc.) while still providing the visible lead and/or suggestion for the user to navigate to view additional selectable impressions 414.

A purchase of an instrument and/or browsing of impressions may further impact the application variants associated with, or linked to registered user data object associated with the user making the purchase. In some embodiments, an optional prompt may be implemented, enabling the user to confirm or decline the addition of an application variant. For example, the user interface component engine 130 may prompt the user with an indication that their purchase is related to food and dining, and asking if the user would like to see more food and dining deals in the future. Variations of such a prompt following a purchase of an instrument and/or browsing of impressions may be implemented, such as in an instance a purchase is irrelevant to prior purchases and/or known application variants associated the registered user data object, example embodiments may prompt the user and ask if they are shopping for and/or browsing for an unregistered persona data object such as 'spouse,' 'kids under 12,' 'teenagers,' and/or the like. For example, the user interface component engine 130 may prompt the user with, "This deal is often purchased for kids under 12. Do you frequently shop for kids under 12?" If the user confirms or answer 'Yes,' example embodiments may add an application variant representing the child-related predefined persona data object that represents "Who do you shop for." Similar prompts may be provided relating to the self-selected predefined persona data object and/or a co-participant predefined persona data object. For example, following a purchase of an instrument or browsing of impressions, the user interface component engine 130 may prompt the user with a question such as, "What persona(s) best describes you," or "Who do you do things with?" Such questions and example selections are described below with respect to FIG. 5D. The answers to such prompts, including application variants, child-related predefined persona data object, self-selected predefined persona data objects, co-participant predefined persona data object and/or the like, may be stored in associated with the registered user data object.

Returning to the discussion of FIG. 4, the selectable impression 414 displayed at any given time, additionally to or alternatively from being identified based on the active application variants, may be further identified and/or determined based on a relevancy, scoring, and/or ranking algorithm, workflows, and/or model. For example, concepts relating to relevancy, context, scoring and/or ranking disclosed in U.S. Patent Application No. 2020/0320561, "Method And Apparatus Using Context To Determine Consumer Deals," which is hereby incorporated by reference in its entirety. Additionally or alternatively to any of the methods discussed in U.S. Patent Application No. 2020/0320561, example embodiments may engage any other available methods for determining relevancy, such as but not limited to utilizing a third party service. Such methods may be employed, for example, when a large number of active data objects are identified based on the active application variants, such that example embodiments further narrow or rank the relevant active data objects having associated impressions to be displayed to the user.

As shown by operation 306, the network data object processing system 105 includes means, such as memory 204, processor 202, hierarchical database management module 122, repository 140, and/or the like, for responsive to selection of a selectable active application variant component, dynamically determining a second set of active data objects from the active data object database, each active data object of the second set of active data objects identified based on interdependence with the active application variant associated with the selected selectable active application variant component. As shown by operation 308, the network data object processing system 105 includes means, such as memory 204, processor 202, hierarchical database management module 122, repository 140 and/or the like, for further responsive to the selection of the selectable active application variant component, causing display of a second set of selectable impressions, wherein each of the selectable impressions of the second set is associated with an active data object of the second set of active data objects. In this regard, the scrollable impression carousel 418 dynamically updates to reflect a selected one of the selectable active application variant components 406, and may therefore reflect a second set of active data objects, identified from the repository 140 as referencing the selected active application variant. In certain embodiments, in addition to selection of a different active application variant component, any of the relevancy, scoring, and/or ranking algorithms or workflows which may utilize additional data points such as but not limited to context, implicit and explicit data, and/or the like, such as those described in U.S. Patent Application No.

2020/0320561, may be rerun and/or updated such that second set of selectable impressions may be further impacted accordingly.

Moreover, if the user is uninterested in any of the selectable impressions 414, they may be more informed than they were according to prior systems that did not indicate why the impressions displayed were selected for the user. Example embodiments therefore improve upon such systems by visually indicating in the scrollable exploration carousel 404, which application variants are active, which one(s) of the active applications variants are currently selected, and enabling the user to understand the connection between the application variants and the displayed impressions, such as the selectable impressions 414. This may further entice the user to update their active application variants, such as by way of various menus and/or configuration screens provided by the network data object processing system 105, such as the example user interface depicted in FIGS. 5A-5F, described in further detail below.

The selectable application sub-variant 410 may be optional in certain embodiments, and may be used for a variety of functions. In one embodiment, such as in the example depicted, the selectable application sub-variant 410 reflects an application sub-variant 'Experience Together' associated with a pre-selected, or defaulted selectable active application variant component 406, 'Things to Do.' Selection of the selectable application sub-variant 410 may further control the selectable impressions 414 in the scrollable impression carousel 420. For example, the active data objects identified in repository 140 may be further filtered and/or selected based on a selected application sub-variant 410. Other examples of a sub-variant, such as a sub-variant of an application variant 'Food and dining' may include Italian restaurants, for example. Numerous variations of application variants (e.g., categories) and corresponding sub-variants (e.g., sub-categories) may be contemplated. The larger area occupied by the selectable application sub-variant 410 may draw user appeal in some scenarios or user contexts, whereas the scrollable impression carousel 418 may draw user appeal in other scenarios or user contexts. For example, a user with limited attention toward their user device may be more drawn to a large are with more imagery and less text. A user looking for a specific type of promotion, on the other hand, may be more likely to engage with the scrollable impression carousel 418. Providing different levels of information, and different amounts of images, text, and with different size and fonts may increase visual appeal and user satisfaction, and may further drive an increase in the time a user spends browsing, shortens the time until a purchase is made, and/or increase the likelihood of a purchase.

Figures 5A, 5B:
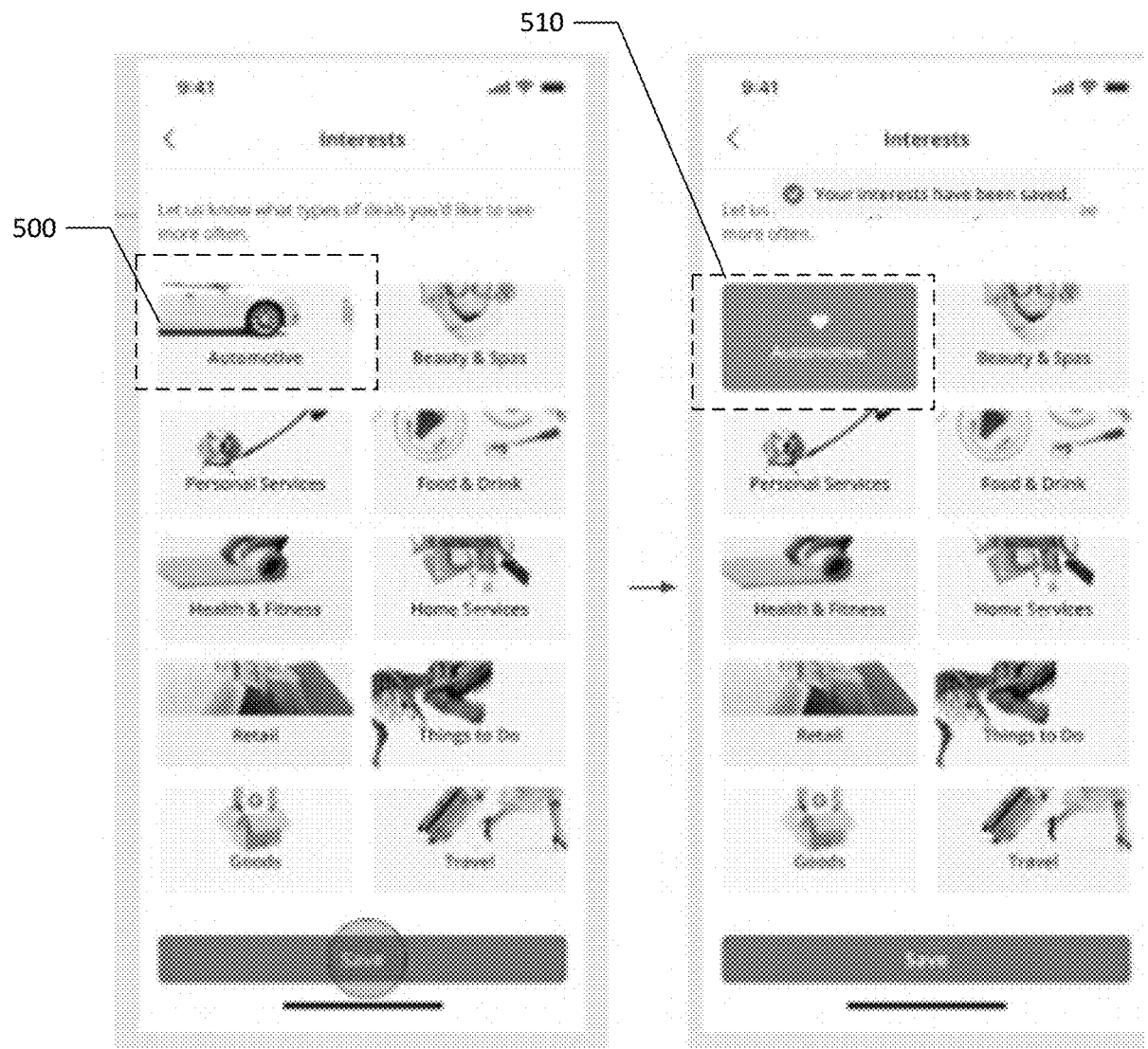
Figure 5C:
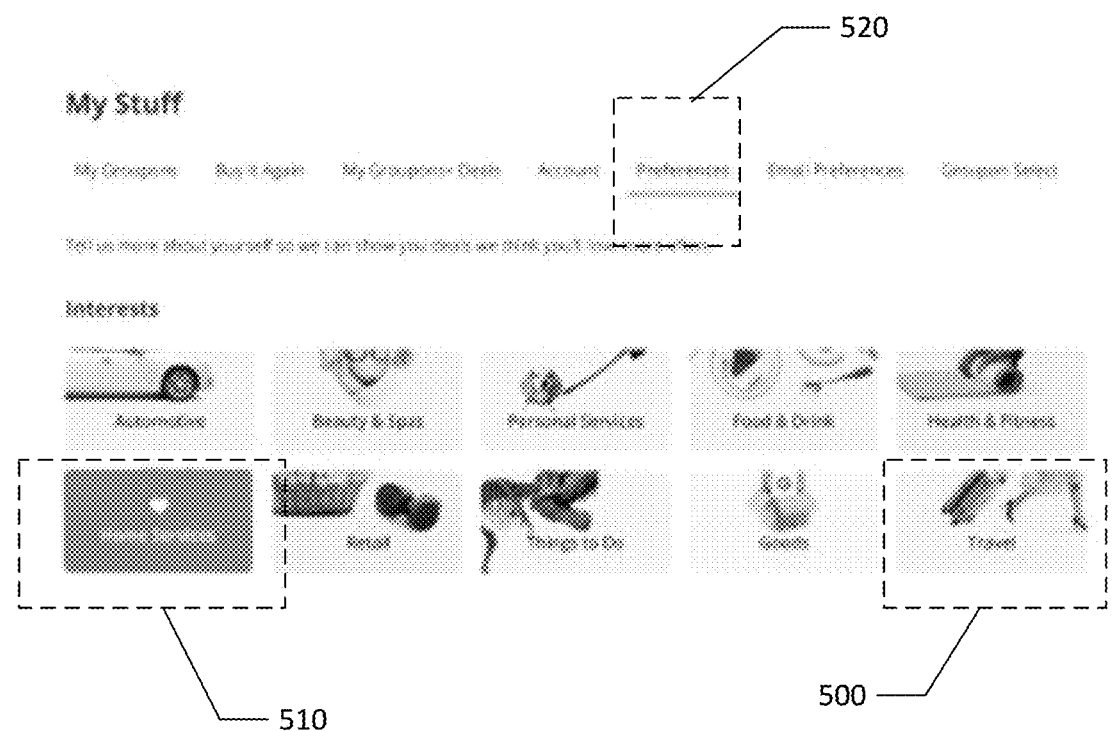

FIGS. 5A and 5B are example user interfaces that may be provided by the network data object processing system 105, such as with user interface component engine 130. A register user may access such a user interface with user device 110 to confirm and/or edit their active application variants, such as interests or categories. According to certain embodiments, selectable application variant option components 500 may be displayed for each application variant available in repository 140, such as the hierarchical database. In certain embodiments, the plurality of selectable application variant option components 500 may be displayed in a tiled layout as depicted in FIGS. 5A and 5B. A selectable application variant option component 500 may include a visual component such as an image, and a textual descriptor. Upon selection of a selectable application variant option component 500, the user interface may transition to a state as depicted in FIG. 5B, in which any transitioned selectable application variant option components 510, associated with the active application variants, are visually distinguished from those that are not transitioned, or those that are associated with inactive application variants. Inactive application variants reflect categories the user is not particularly interest in, and promotions relating to such application variants may not be displayed to the user, or may be displayed less frequently than those associated with active application variants of the user. In this regard, the components of FIG. 5A or FIG. 5B may be selected to toggle the active/inactive status of the corresponding application variant. FIG. 5C shows another variation of the user interface of FIGS. 5A and 5B, which may be suitable for a web-based user interface display. A user navigating to a preferences tab 520 may view selectable application variant option components 500 and/or transitioned selectable application variant option components 510, associated with the active application variants, and toggle any of the components similarly as described with regard to FIGS. 5A and 5B. According to certain embodiments, in a circumstance in which a selectable application variant option component is inactive, the corresponding selectable application variant option component comprises (a) a visual component comprising at least an image, and (b) a textual descriptor. In a circumstance in which a selectable application variant option component is active, the visual component transitions to have a different appearance.

Additional preferences or user data selected by a user but not illustrated in FIGS. 5A, 5B, and 5C include selection of predefined personas as self-selected predefined persona data objects, child-related predefined persona data objects, and/or co-participant predefined persona data objects. Such selections may be made via another portion of the user interface of those of FIGS. 5A, 5B and/or 5C and/or via a differ user interface screen. Selection of such predefined personas as self-selected predefined persona data objects child-related predefined persona data objects and/or co-participant predefined persona data objects may be reflected in the hierarchical database, such as repository 140, and may further impact the active data objects identified in the repository 140 to be represented by selectable impressions 414. Additional profile data may be selected via user interfaces such as those of FIGS. 5D and 5F. As depicted in the user interface of FIG. 5D, a user may enter a birthday 530, age 540, and/or gender 550.

As depicted in the user interface of FIG. 5E, a user may select one or more persona(s) 552, such as but not limited to mom, dad, young adult, and/or the like. Upon selection, the persona is a self-identified predefined persona. A user may further indicate one or more co-participant references 554 such as a type(s) of person with whom they do things with. For example, in response to "Who do you do things with?" a user may indicate, 'the guys,' 'the girls,' 'adult only,' 'mixed-ages,' and/or the like. The user may also provide one or more child-related predefined user reference(s) 556. For example, in response to, "Who do you shop for?" a user may indicate, 'a spouse,' 'my kids U-12 (under 12),' and/or the like.

Figure 5F:
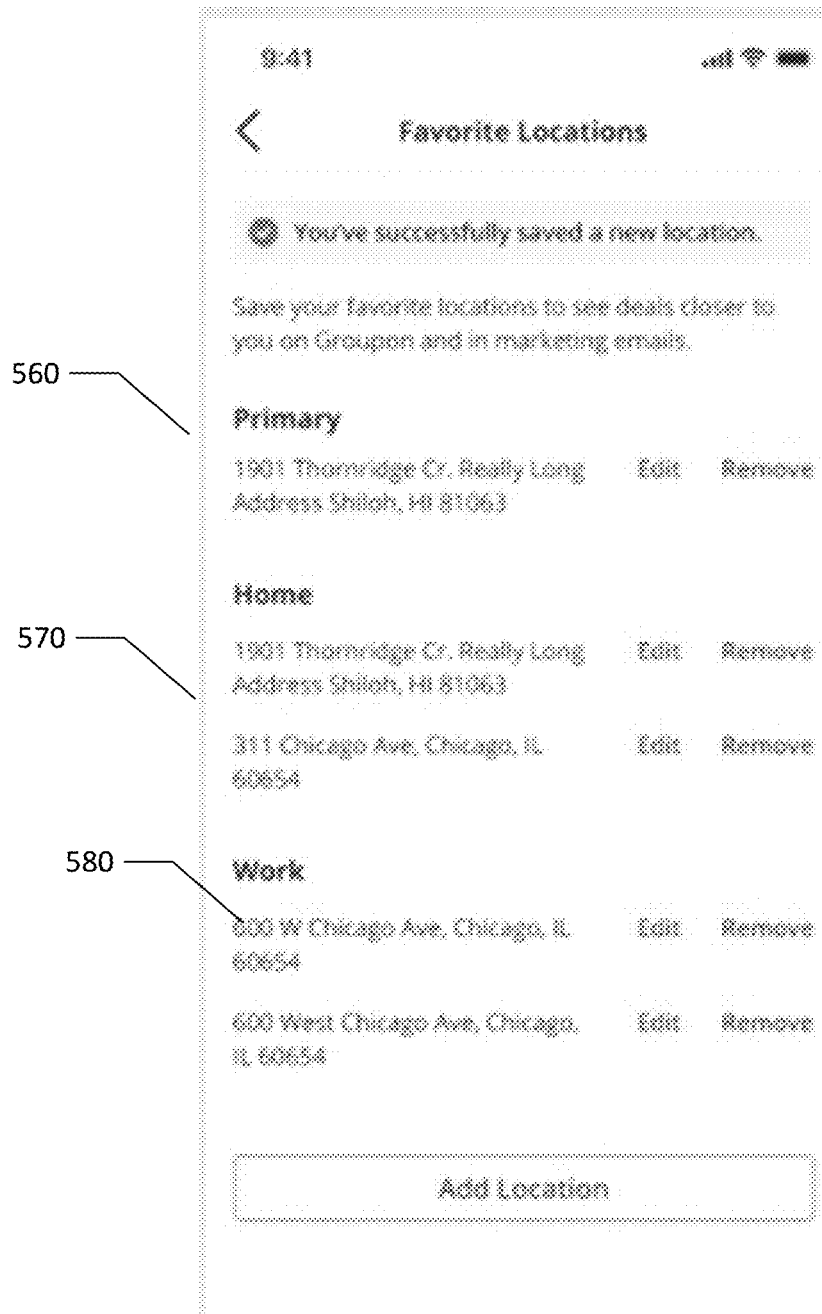
Figure 6:
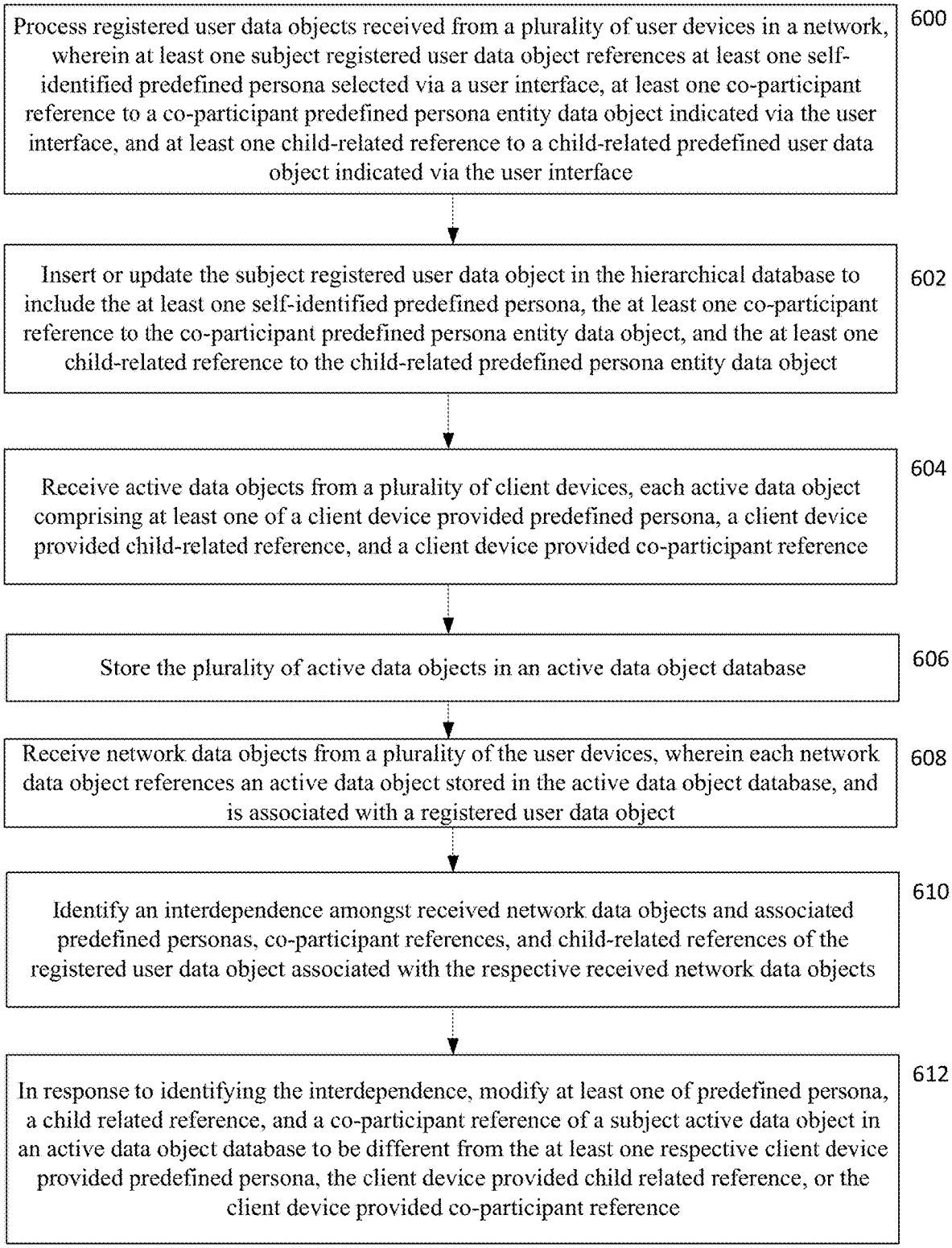
FIG. 6 is a flowchart illustrating operations performed by a network data object processing system in accordance with various embodiments of the present disclosure.

As depicted in the user interface of FIG. 5F, a user may enter multiple locations such as those relating to a primary address 560, home address 570, work address 580, and/or the like.

In this regard, the identified selectable impressions 414 provided in the scrollable impression carousel 418 may be further targeted for the registered and logged on user. In addition to being associated with the selectable active application variants, the corresponding promotions may be identified as likely interesting for a user with a certain self-selected predefined persona and/or having selected a child-related predefined persona and/or co-participant predefined persona. Additionally or alternatively, the selectable impressions 414 provided in the scrollable impression carousel 418 may be further targeted for the registered and logged on user based on any explicit data such as the profile data illustrated in FIGS. 5D and 5F. In instances in which the browsing for toggle 403 is present, and set to a child-related user mode, the selectable impressions 414 may be targeted to the selected child-related predefined persona, rather than other data (e.g., application variants) associated with the registered user data object.

The disclosures provided herein may improve upon existing network data object processing systems by providing improved transparency to users as to why impressions on a user interface are selected and displayed for them, and improved control for such users to modify certain application variants such that the user can impact or at least partially control what impressions are displayed. Example embodiments therefore improve user satisfaction, may increase user access to the mobile application and/or website, and therefore increase transactions performed over the network data object processing system 105.

According to certain embodiments, providers engaging with the network data object processing system 105 may overzealously create associations and/or hierarchical relationships for their promotions with certain application variants and/or personas in an effort to have an impression associated with their promotion frequently displayed. For instance, a user representing a provider that is entering details of an active data object associated with a promotion to be offered on behalf of the provider may select every option presented relating to application variants, associated personas, and/or the like, despite the application variants and/or associate personas being unrelated to the promotion. This may result in poor selection by the system of targeted promotions for a user. Accordingly, example embodiments may modify certain associations or relationships that a provided by a client device, such as a user device 110 employed by a provider (e.g., provider device), to improve the relevancy of the active data object, as described in further detail below.

As shown by operation 600, the network data object processing system 105 includes means, such as memory 204, processor 202, communications circuitry 208, hierarchical database management module 122, and/or the like, for processing registered user data objects received from a plurality of user devices in a network, wherein at least one subject registered user data object references at least one self-identified predefined persona selected via a user interface, at least one co-participant reference to a co-participant predefined persona entity data object indicated via the user interface, and at least one child-related reference to a child-related predefined user data object indicated via the user interface. In this regard, a user may indicate via a user interface at least one self-identified predefined persona. For example, a user may be prompted with a question such as "What persona do you identify with?" In response, the user may indicate they are a 'mom,' a 'dad,' or 'young adult.' A user may further indicate a co-participant reference such as a type of person or persona with whom they do things with. For example, in response to "Who do you do things with?" a user may indicate, 'the guys,' 'adult only,' 'mixed-ages,' and/or the like. The user may also provide child-related predefined user references. For example, in response to, "Who do you shop for?" a user may indicate, 'a spouse,' 'my kids U-12 (under 12),' and/or the like.

As shown by operation 602, the network data object processing system 105 includes means, such as memory 204, processor 202, repository 140, hierarchical database management module 122, and/or the like, to insert or update the subject registered user data object in the hierarchical database to include the at least one self-identified predefined persona, the at least one co-participant reference to the co-participant predefined persona entity data object, and the at least one child-related reference to the child-related predefined persona entity data object. In this regard, the data provided by the user may be updated in or inserted in the hierarchical database of repository 140. The data may be utilized in discovering and/or targeting active data objects based optionally on active application variants, and optionally further based on any of the self-identified predefined personas, co-participant references, and/or child-related references.

As shown by operation 604, the network data object processing system 105 includes means, such as memory 204, processor 202, repository 140, active data object configuration module 128, hierarchical database management module 122, and/or the like, for receiving active data objects from a plurality of client devices, each active data object comprising at least one of a client device provided predefined persona, a client device provided child-related reference, and a client device provided co-participant reference. In this regard, a user affiliated with a provider, merchant, and/or retailed can enter details of a promotion for the network data object processing system 105 to offer on behalf of the provider. The provider may enter, via the client device, or provider device, any characteristics they believe to be associated with the promotion, such as, but not limited to the promotion being suitable for 'children under 12,' 'adults,' users that 'shop for a spouse,' and/or the like. The user may further configure an active data object to be related to certain application variants such as 'food and dining,' 'travel,' and/or the like. The user configuring the active data object via the provider device and/or client device may enter any data describing users they believe would be interested in the promotion, such as but not limited to any user data that a user could configure via a user profile, such as via the user interfaces of FIGS. 5A-5F. In some instances, the user may enter every option, or a larger number of options than what is realistically descriptive of the promotion.

As shown by operation 606, the network data object processing system 105 includes means, such as memory 204, processor 202, communications circuitry 208, repository 140, and/or the like, for storing the plurality of active data objects in an active data object database. The active data objects may be stored in the repository 140, such as in an active data object database, and may be accessed to present associated promotions to users via impressions, such as the selectable impressions 414 of FIG. 4. The active data objects may further reference personas and/or other data in the hierarchical database, based on the information entered by a user affiliated with the provider, with respect to operation 604. The active data objects may be filtered and/or dynamically identified for display in the scrollable impression carousel 418 for particular users based on relevancy, application variants, hierarchical relationships, and/or the like.

As shown by operation 608, the network data object processing system 105 includes means, such as memory 204, processor 202, communications circuitry 208, network data object management module 120 and/or the like, for receiving network data objects from a plurality of the user devices, wherein each network data object references an active data object stored in the active data object database, and is associated with a registered user data object. The network data objects therefore indicate instruments of promotions purchased by registered users via the network.

As shown by operation 610, the network data object processing system 105 includes means, such as memory 204, processor 202, interdependence identification engine 126 and/or the like, for identifying an interdependence amongst received network data objects and associated predefined personas, co-participant references, and child-related references of the registered user data object associated with the respective received network data objects. In this regard, the interdependence identification engine 126 may use machine learning algorithms, such as but not limited to those based upon computer-implemented linear regression models, polynomial regression models, logistic regression models, and/or the like to identify interdependence between certain characteristics of promotions (or active data objects) and the registered users purchasing the associated instruments. In this regard, the processor 202 as directed by the interdependence identification engine 126 processes the network data objects and associated predefined personas, co-participant references, and child-related references of the registered user data object to determine correlations therebetween. A model may therefore be trained based on forward selection, backward elimination, bidirectional elimination, and/or any other computer-automated stepwise regression to determine predictive variables and which relationships are the strongest indicators of relevancy, in terms of a relevant promotion for a user, and relevant relationships by which to characterize a promotion.

In this regard, the interdependence identification engine 126 can identify user data representing a type of user that is likely to buy an instrument of a certain type of promotion characterized by particular application variants, sub-variants, predefined personas, co-participant references, child-related references, and/or the like. Still further, the interdependence identification engine 126 can identify application variants, and/or categories, of promotions likely to be purchased by users having specific relationships as defined in the hierarchical database, such as active application variants, self-selected predefined personas, co-participant references, and child-related references.

It should be appreciated that the distinction between self-identified predefined personas, co-participant references to predefined personas, and/or child-related references to predefined personas may be significant. For example, the interdependence identification engine 126 may determine promotions for certain types of products, goods, and/or services are more frequently purchased as gifts and are therefore correlated with a child-related reference rather than a self-selected predefined persona. For example, a promotion for a massage, or chocolate covered strawberries, may be identified as being enjoyed most frequently by women, but may be identified as having high relevancy for a man who purchase gifts for his wife, rather than only being relevant for a woman. Similarly, promotions for certain activities, such as an escape room, may be purchased by those having indicated they like to do things with adult groups, based on their co-participant preferences. In this regard, such a promotion may not be targeted for just any adult, but those who have indicated the relevant co-participant data object.

As shown by operation 612, the network data object processing system 105 includes means, such as memory 204, processor 202, interdependence identification engine 126, and/or the like, for in response to identifying the interdependence, modifying at least one of predefined persona, a child related reference, and a co-participant reference of a subject active data object in the transactable database to be different from the at least one respective client device provided predefined persona, the client device provided child related reference, or the client device provided co-participant reference. In this regard, the interdependence identification engine 126 can identify an active data object in the transactable database which may have misleading, incorrect, or irrelevant correlations, associations, and/or hierarchical relationships. For example, as introduced above, if a provider is setting up a new promotional offering, the provider may select every application variant, category, and/or relationship within a hierarchy (e.g., 'do things with adults,' 'do things with mixed ages,' 'shop for spouse,' etc.), in an effort to have their promotion displayed as frequently as possible. The interdependence identification engine 126 may therefore identify such selections that were provided via a client device, such as a user device 110 affiliated with a provider, and modify any of the applicant variants, predefined persona, a child related reference, and a co-participant reference. In this regard, any of the applicant variants, predefined persona, a child related reference, and a co-participant reference may be deleted, modified, and/or otherwise corrected. For example, for a promotion initially setup as relevant for a user shopping for and/or browsing for a child and a spouse, the interdependence identification engine 126 may update the relationships in the hierarchical database such that the hierarchical database indicates the associated active data object is relevant for a user shopping for and/or browsing for a child, but not a spouse.

Accordingly, the relevancy of the displayed impressions may be improved, such that instruments associated with promotions that would previously be displayed due to overzealous classification and/or characterization by a provider despite being irrelevant for the particular classification and/or characterization are no longer displayed, or displayed less frequently, in the irrelevant scenarios. The user interface of the network data object processing system 105 is therefore improved by systematically impacting the impressions displayed to a user, such as those in the scrollable impression carousel 418. The improved network data object processing system 105 therefore improves user satisfaction and increases mobile application and/or website visits, thereby further improving purchase rates and revenue for both providers, retailers and/or merchants at which the instruments are redeemed, and for a promotion and marketing service affiliated with the network data object processing system 105.

Figure 7:
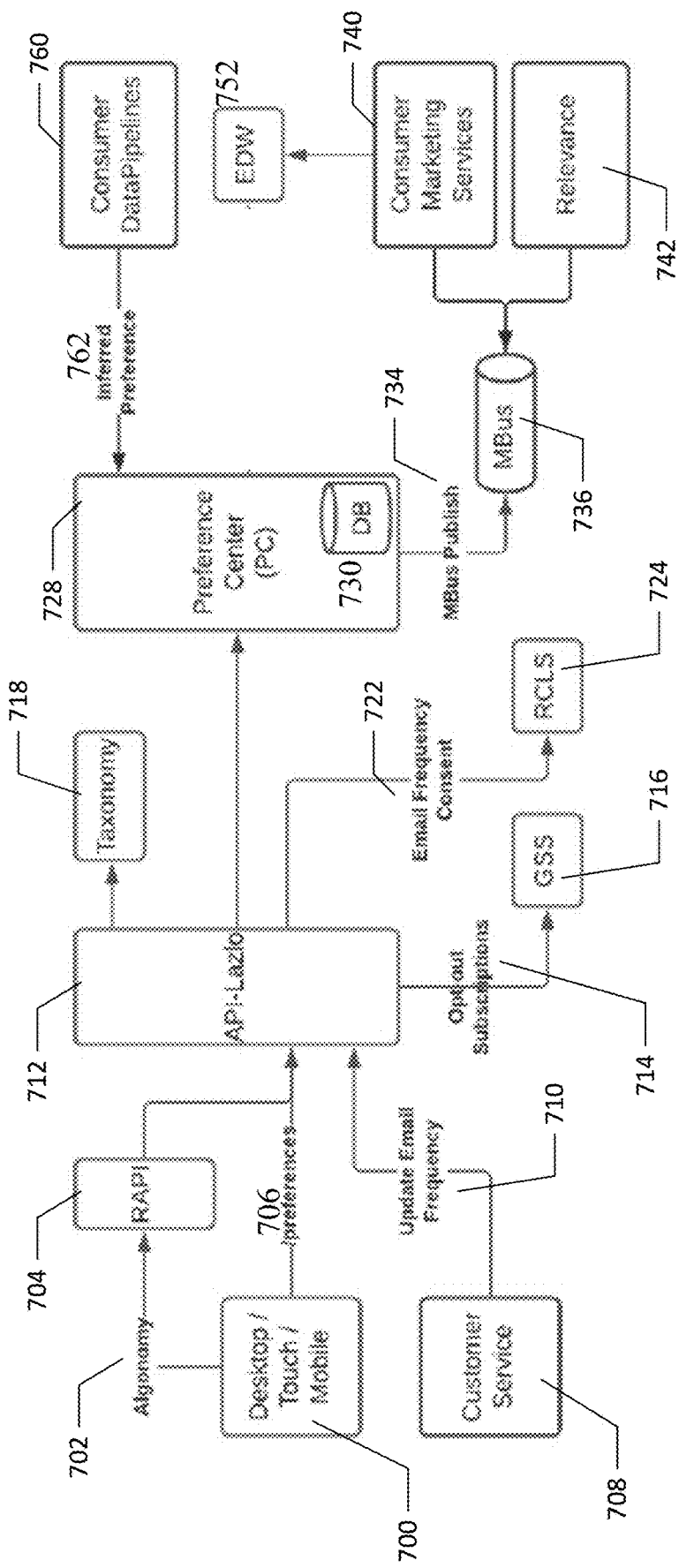
FIG. 7 is an example diagram of a network architecture implemented by a network data object processing system in accordance with various embodiments of the present disclosure.

FIG. 7 provides an example network architecture that may be implemented by network data object processing system 105. In response to a user accessing a desktop, touch or mobile application of the network data object processing system 105, the system may invoke an algonomy service 702, communicatively connected to a remote application programming interface (RAPI) 704. Access to the application may further enable access to preferences 706 menus such as those of FIGS. 5A-5F. Customer service inquiries 708 may include updates to email frequency 710. The various services may invoke the application programming interface (API) Lazio 712 which may include a public API layer to route and process consumer transactions, traffic and/or interaction such as from the web and/or from mobile applications. API Lazio 712 may further may enable an opt-out of subscriptions 714, and/or querying of a computer-implemented general social survey (GSS) 716 and taxonomy

718. The API Lazio may further enable update to email frequency consent 722 in the regulatory consent log service RCLS 724.

Information provided via the API Lazio may be updated in the preference center (PC) 728, such as but not limited to the hierarchical database and/or any other database 730 therein. Mbus (Message bus) publish process 734 stores data to the corresponding Mbus repository 736, which may also be updated via consumer marketing service 740 and relevance engine 742, with associated data being populated in the enterprise database warehouse (EDW) 752. Numerous consumer data pipelines 760 can feed additional data to populate the preference center 728 with inferred preferences 762.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus configured for maintaining an active data object database of active data objects representative of promotions available for purchase and received from a plurality of client devices associated with providers and operable in a network, dynamically determining interdependence, based on relevancy, amongst the active data objects and a plurality of application variants, and updating a multi-carousel interface to display dynamically identified active data objects based on the interdependence with at least one active application variant associated with a logged on user, the apparatus comprising at least one processor and at least one non-transitory memory comprising program code, the at least one non-transitory memory and the program code configured to, with the at least one processor, cause the apparatus to at least:

receive a request from a user device to access at least one of a website or mobile application of a network data object processing system;

in response to receiving the request, determine the at least one active application variant, and a first set of active data objects from the active data object database that are interdependent with the at least one active application variant;

cause display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects;

responsive to selection of a selectable active application variant component, dynamically determine a second set of active data objects from the active data object database, each active data object of the second set of active data objects identified based on interdependence with the active application variant associated with the selected selectable active application variant component;

further responsive to the selection of the selectable active application variant component, cause display of a second set of selectable impressions, wherein each of the selectable impressions of the second set is associated with an active data object of the second set of active data objects;

cause display of selectable application variant option components, wherein in a circumstance in which a selectable application variant option component is inactive, a corresponding selectable application variant option component comprises (a) a visual component comprising at least an image associated with a respective selectable application variant option component, and (b) a textual descriptor, and in a circumstance in which a selectable application variant option component is active, a corresponding selectable application variant option component comprises (a) a visual component comprising at least a common image associated with the active selectable application variant option components, and (b) a textual descriptor;

in response to receiving an indication of toggling a selectable application variant option component from an inactive to active status, cause a respective application variant to transition from an active and inactive status, wherein the toggling and the transition from an inactive to active status causes a respective visual component comprising at least the image associated with a respective selectable application variant option component to transition to the common image, and further causes the active data objects to be updated to include data objects associated with an active selectable application variant option component; and in response to receiving an indication of toggling a selectable application variant option component from an active to active status, cause a respective application variant to transition from an inactive and active status, wherein the toggling and the transition from an active to inactive status causes a respective visual component comprising at least the common image to transition to the image associated with a respective selectable application variant option component, and further causes the active data objects to be updated to include data objects associated with an active selectable application variant option component.

2. The apparatus according to claim 1, wherein each of the selectable impressions indicates an instrument defined by an accepted value, a promotional value, and a provider at which the instrument can be redeemed.

3. The apparatus according to claim 1, wherein the at least one non-transitory memory and the program code are further configured to, with the at least one processor, cause the apparatus to at least:

responsive to selection of a selectable impression, enable purchase of an instrument for an accepted value, redeemable for a promotional value at a provider.

4. A method configured for maintaining an active data object database of active data objects representative of promotions available for purchase and received from a plurality of client devices associated with providers and operable in a network, dynamically determining interdependence, based on relevancy, amongst the active data objects and a plurality of application variants, and updating a multi-carousel interface to display dynamically identified active data objects based on the interdependence with at least one active application variant associated with a logged on user, the method comprising:
- receiving a request from a user device to access at least one of a website or mobile application of a network data object processing system;
- in response to receiving the request, determining the at least one active application variant, and a first set of active data objects from the active data object database that are interdependent with the at least one active application variant;
- causing display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects;
- responsive to selection of a selectable active application variant component, dynamically determining a second set of active data objects from the active data object database, each active data object of the second set of active data objects identified based on interdependence with the active application variant associated with the selected selectable active application variant component;
- further responsive to the selection of the selectable active application variant component, causing display of a second set of selectable impressions, wherein each of the selectable impressions of the second set is associated with an active data object of the second set of active data objects;
- causing display of selectable application variant option components, wherein in a circumstance in which a selectable application variant option component is inactive, a corresponding selectable application variant option component comprises (a) a visual component comprising at least an image associated with a respective selectable application variant option component, and (b) a textual descriptor, and in a circumstance in which a selectable application variant option component is active, a corresponding selectable application variant option component comprises (a) a visual component comprising at least a common image associated with the active selectable application variant option components, and (b) a textual descriptor;
- in response to receiving an indication of toggling a selectable application variant option component from an inactive to active status, causing a respective application variant to transition from an active and inactive status, wherein the toggling and the transition from an inactive to active status causes a respective visual component comprising at least the image associated with a respective selectable application variant option component to transition to the common image, and further causes the active data objects to be updated to include data objects associated with an active selectable application variant option component; and
- in response to receiving an indication of toggling a selectable application variant option component from an active to active status, causing a respective application variant to transition from an inactive and active status, wherein the toggling and the transition from an active to inactive status causes a respective visual component comprising at least the common image to transition to the image associated with a respective selectable application variant option component, and further causes the active data objects to be updated to include data objects associated with an active selectable application variant option component.

5. The method according to claim 4, wherein each of the selectable impressions indicates an instrument defined by an accepted value, a promotional value, and a provider at which the instrument can be redeemed.

6. The method according to claim 4, further comprising:
- responsive to selection of a selectable impression, enabling purchase of an instrument for an accepted value, redeemable for a promotional value at a provider.

7. A computer program product configured for maintaining an active data object database of active data objects representative of promotions available for purchase and received from a plurality of client devices associated with providers and operable in a network, dynamically determining interdependence, based on relevancy, amongst the active data objects and a plurality of application variants, and updating a multi-carousel interface to display dynamically identified active data objects based on the interdependence with at least one active application variant associated with a logged on user, the computer program product comprising at least one non-transitory computer-readable storage medium having computer-executable program code instructions stored therein, the computer-executable program code instructions comprising program code instructions to:
- receive a request from a user device to access at least one of a website or mobile application of a network data object processing system;
- in response to receiving the request, determine the at least one active application variant, and a first set of active data objects from the active data object database that are interdependent with the at least one active application variant;
- cause display of the multi-carousel interface, the multi-carousel interface comprising at least a scrollable exploration carousel and a scrollable impression carousel, the scrollable exploration carousel comprising a plurality of selectable active application variant components, and the scrollable impression carousel comprising a first set of selectable impressions, wherein each of the selectable impressions of the first set is associated with at least one of the first set of active data objects;
- responsive to selection of a selectable active application variant component, dynamically determine a second set of active data objects from the active data object database, each active data object of the second set of active data objects identified based on interdependence with the active application variant associated with the selected selectable active application variant component;
- further responsive to the selection of the selectable active application variant component, cause display of a second set of selectable impressions, wherein each of the selectable impressions of the second set is associated with an active data object of the second set of active data objects;
- cause display of selectable application variant option components, wherein in a circumstance in which a selectable application variant option component is inactive, a corresponding selectable application variant option component comprises (a) a visual component comprising at least an image associated with a respective selectable application variant option component, and (b) a textual descriptor, and in a circumstance in which a selectable application variant option component is active, a corresponding selectable application variant option component comprises (a) a visual component comprising at least a common image associated with the active selectable application variant option components, and (b) a textual descriptor;

in response to receiving an indication of toggling a selectable application variant option component from an inactive to active status, cause a respective application variant to transition from an active and inactive status, wherein the toggling and the transition from an inactive to active status causes a respective visual component comprising at least the image associated with a respective selectable application variant option component to transition to the common image, and further causes the active data objects to be updated to include data objects associated with an active selectable application variant option component; and in response to receiving an indication of toggling a selectable application variant option component from an active to active status, cause a respective application variant to transition from an inactive and active status, wherein the toggling and the transition from an active to inactive status causes a respective visual component comprising at least the common image to transition to the image associated with a respective selectable application variant option component, and further causes the active data objects to be updated to include data objects associated with an active selectable application variant option component.

8. The computer program product according to claim 7, wherein each of the selectable impressions indicates an instrument defined by an accepted value, a promotional value, and a provider at which the instrument can be redeemed.

9. The computer program product according to claim 7, wherein the computer-executable program code instructions further comprise program code instructions to:

responsive to selection of a selectable impression, enable purchase of an instrument for an accepted value, redeemable for a promotional value at a provider.

* * * * *